United States Patent [19]

VanderLans

[11] 4,070,904
[45] Jan. 31, 1978

[54] PIPELINE JOINT TESTER

[76] Inventor: Gerald G. VanderLans, 1310 W. Turner Road, Lodi, Calif. 95240

[21] Appl. No.: 738,839

[22] Filed: Nov. 4, 1976

[51] Int. Cl.² .......................................... G01M 3/28
[52] U.S. Cl. .................................. 73/40.5 R; 73/49.6
[58] Field of Search ........................... 73/40.5; 138/97

[56] References Cited

U.S. PATENT DOCUMENTS

| 3,400,574 | 9/1968 | Cramer | 73/40.5 R |
| 3,750,711 | 8/1973 | Conklin et al. | 73/40.5 R |
| 3,915,197 | 10/1975 | Piccirilli | 138/97 |

*Primary Examiner*—S. Clement Swisher

*Attorney, Agent, or Firm*—Owen, Wickersham & Erickson

[57] ABSTRACT

A high-pressure joint tester includes a pair (or two pairs) of plugs, each plug having an annular rigid channel containing an inflatable elastomeric annular tube. The spaced, parallel plugs are joined together by a rigid cylindrical wall extending between inner sides of the channels. The tubes are inflated at preselected pressures to seal against interior pipe walls on opposite sides of a locus where two pipe ends meet at a joint, and fluid is introduced under pressure through the cylindrical wall to the outer surface thereof. Rollers support the device for movement through the pipeline to be tested.

17 Claims, 11 Drawing Figures

PIPELINE JOINT TESTER

BACKGROUND OF THE INVENTION

This invention relates to a device and a method for testing the ability of pipe joints to withstand high pressures. It also relates to a method for making gaskets useful in the device.

The present invention is particularly adapted to enable tests of pipe joints for relatively large diameter pipes, that is, pipes two feet in diameter and up. The device can be used with somewhat smaller pipes, but it becomes more significant with the larger diameter pipes, because heretofore the testing of these pipes has been quite difficult. The difficulty has been due in part to the fact that the gaskets intended to isolate the pipe joint and to withstand fluid test pressure applied against the pipe joints have often been displaced and even blown out of the device when the desired testing pressure was applied.

It is an object of the present invention to provide a pipe joint tester in which the gaskets that seal against the pipe wall are retained in place even when high testing pressure is applied to the space between the gaskets and the joint. Thus, leakage, if any, will take place at the pipe joint rather than through the testing apparatus.

Among other problems solved by the invention are those of being able to expel air from the space between the gaskets, the joint tester, and the pipe and ensure that substantially all such air has been displaced by liquid, when the test fluid is a liquid. The device is also operative for testing joints against the leakage of pressurized gases.

Another object of the invention is to provide a joint tester in which a self-contained apparatus is easily moved through a pipeline and set in place at the joint.

Another object of the invention is to provide a safe testing system, avoiding the problems inherent when a gasket is inflated by air.

Another object is to provide an improved method for making inflatable gaskets.

Other objects of the invention will appear from the description below.

SUMMARY OF THE INVENTION

According to the invention, the ability of pipe joints to retain fluids under pressure is tested by rolling along a lower portion of the pipeline an annular frame smaller than the interior of the pipeline, until the frame bridges a joint to be tested, and inflating a spaced-apart pair of inflatable gasket rings that are rigidly retained by the frame, one on each side of the joint. Inflation of the gaskets seals off the exterior of the frame in between the gaskets, relative to each of the two pipes which form the joint. Then a fluid under known pressure is introduced between the gasket rings and through the frame, into the annular space between the frame and the pipes. The assembly is then observed to see whether there is any leakage of the fluid out from that annular space.

The rigid annular frame has a cylindrical wall, and two channels may be provided by four successive radially outwardly extending walls integral with the cylindrical wall. Thus, one annular gasket ring fills the space between the first and second walls, while a second similar gasket ring fills the space between the third and fourth walls. Each inflatable ring has an interior circular passage and an inlet in an inner cylindrical wall thereof.

A chordal support plate may bridge across an interior arc of the cylindrical wall of the frame, in one form of the invention, and, a gas regulator valve may be secured rigidly to the chordal plate. The regulator valve has an inlet for receiving gas under high pressure and an outlet for gas under regulated pressure. Conduits connect the outlet of the regulator valve to the inlets of both inflatable rings, and a pressure gauge is also connected to the outlet.

A fluid inlet leads through the frame's cylindrical wall to the test space between the second and third radially outwardly extending walls. To this inlet is connected the outlet from a fluid control valve and a pressure gauge, and the valve has an inlet for fluid under pressure.

An air drain tube extends through and above the frame's cylindrical wall into the test space at the highest portion thereof.

A plurality of rollers are mounted to lower areas of the frame, for supporting the testing apparatus as it is moved through a pipeline whose joints are to be tested.

In another form of the invention, the gasket ring inflation is done by water impelled by air pressure.

In still another form of the invention, there are four gasket rings, two on each end, and the inflation is done by water from a system that also controls the test liquid.

Other advantages and features of the invention will appear from the following description of a preferred embodiment as shown in the drawings.

DESCRIPTION OF A PREFERRED EMBODIMENT

Figure 1:
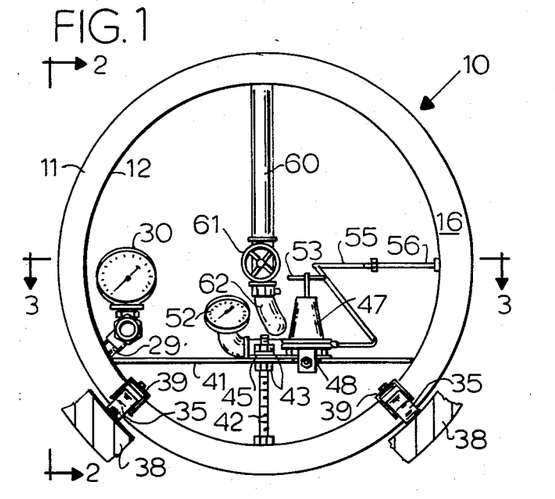
FIG. 1 is a view in end elevation of a pipe joint testing apparatus of the invention. A portion of a pipe in which the device is used is shown in section to indicate the contact of the rollers therewith.
Figure 2:
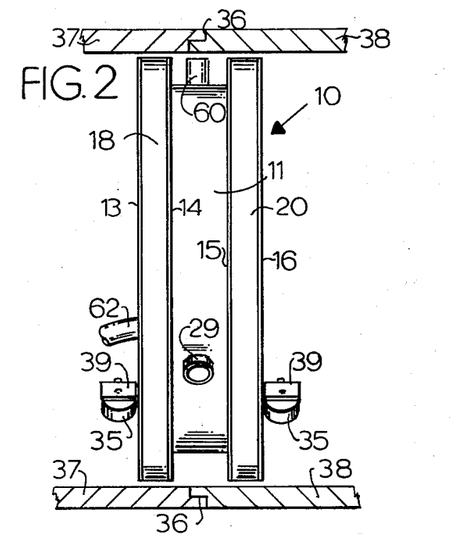
FIG. 2 is a side elevation view taken along the line 2—2 in FIG. 1, with the pipe joint being shown.
Figure 3:
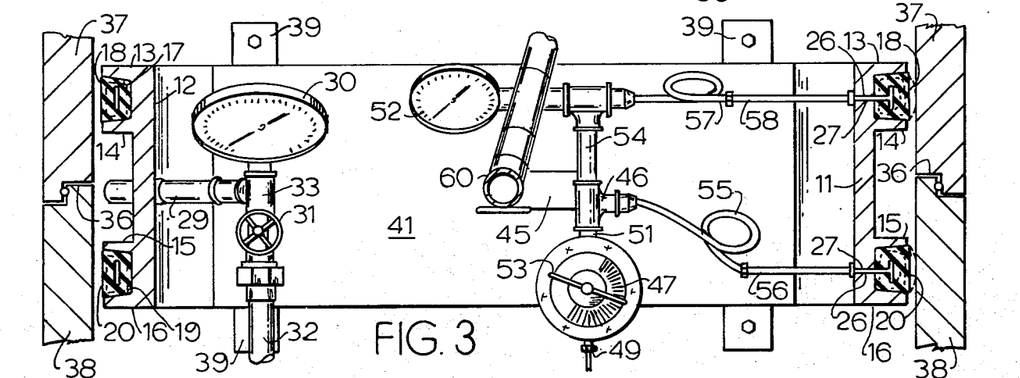
FIG. 3 is an enlarged view in section taken along the line 3—3 in FIG. 1 and showing the pipe joint and many components of the joint tester, mounted within its annular frame.
Figure 4:
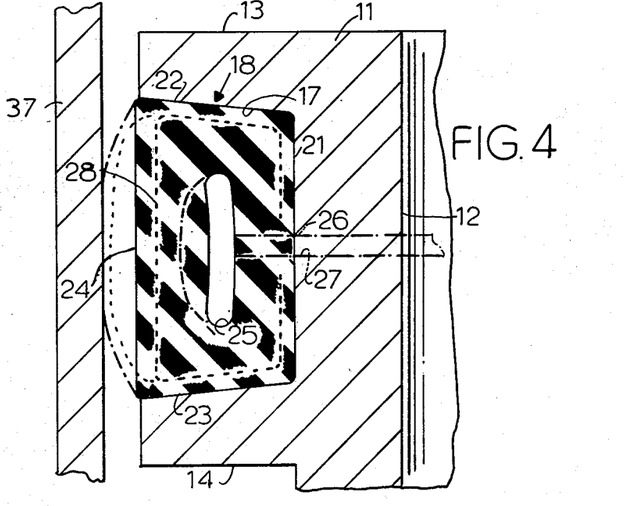
FIG. 4 is a further enlarged view at one of the retaining gaskets, with its inflated testing position shown in dashed lines.

A tester 10 embodying the principles of the invention is shown in the drawings. As shown in FIGS. 1, 2, and 3, the tester 10 includes a rigid annular frame 11 that has a cylindrical wall 12 and has four successive radially outwardly extending walls 13, 14, 15, and 16 which are integral with the cylindrical wall. This may be done by welding a pair of channels to the wall or by welding a series of radial flanges to it. Between the first and second of these walls 13 and 14 is a channel space 17 which retains a gasket 18, and between the third and fourth walls 15 and 16 is a channel space 19 which retains the gasekt 20. The gaskets 18 and 20 may be identical. In both cases they comprise, as best seen in FIG. 4, a hollow annular inflatable ring having a radially inner cylindrical surface 21, a pair of side walls 22 and 23 which may slope outwardly, and a cylindrical radially outer wall 24. There is also an interior passageway 25 which circles completely around the gasket ring. This may be approximately rectangular in cross section before inflation. At some point along each gasket there is an air inlet fitting 26 which is aligned with an opening 27 through the cylindrical frame wall 12. This enables air to be supplied to the gaskets for inflating them. As shown in FIG. 4, reinforcing cords 28 may be included in the walls of the gaskets, interrupted only in the inner wall 21, for strengthening the gaskets during inflation.

Between the second and third radial flanges or walls 14 and 15 is an opening through which a fitting or conduit 29 extends for conducting a fluid into this test space. As shown in FIGS. 1 and 3, the conduit 29 is connected to a pressure gauge 30 and a control valve 31, which may be coupled to a flexible supply line 32 for pressurized fluid when a test is to be made. As also indicated, the inlet fitting 29 may be used to support a tee 33 on one side of which is mounted the pressure gauge 30 and on the other side of which is the valve 31. The fluid used for testing may be a liquid such as water or oil, or it may be air or any other appropriate gas, such as natural gas.

To enable the pipe joint tester to be moved conveniently into place, its outer periphery is made sufficiently smaller than the pipe joint to be tested so that it can easily be moved through the pipeline. Its movement through the pipeline is aided by sets of rollers 35 which extend radially outwardly a short distance from the periphery of the apparatus to enable the tester to be easily moved into place at a joint 36 of two adjacent pipe sections 37 and 38. As shown in the drawings, four rollers 35 may be supported by roller carriers 39 affixed by bolting or welding to the inside surface of the cylinder 12 such that the rollers are tilted as shown in FIG. 1 to lie approximately flat against the pipe sections. Thus, the device can simply be pushed into the pipe to any desired point with relatively little friction and little difficulty of positioning.

As shown in FIGS. 1 and 3, a mount for several components of the tester 10 is supplied by a chordal support plate 41 which bridges across an interior arc of the cylindrical wall 12 and may be secured at its ends to the wall by welding, for example. The mounting plate 41 may be horizontal, as shown in the embodiment in the drawings, which represents a pipe tester for the smaller sizes of large diameter pipe. For use with a pipe large enough for the apparatus to be pushed through the pipe by a walking operator, it may be convenient to have the chordal plate 41 in a vertical orientation. The plate may be further stabilized in the cylinder 12 by means of a stud bolt 42 which is welded to the cylindrical wall and extends radially inwardly to a connection with the plate. The connection may include a nut 43 both above and below the plate to rigidly retain the plate against flexing. With this structure, in fact, the plate need not be welded in place and can be removed if desired.

The bolt 42 may also retain in place an extension portion 45 of a tee fitting 46 to which may be attached a pressure regulator valve 47. For proper seating of the regulator valve, it may be fitted into a notch or cutout area 48 provided in the plate so that a portion of it extends down below the plate, as shown in FIG. 1. The regulator valve 47 may be of a conventional type which accepts air or other gas under high pressure from a cylinder or a compressor at an inlet 49 and which releases the gas from its outlet 51 at a well regulated pressure. A pressure gauge 52 may be connected as shown to the outlet fitting 51 so as to enable an operator to know exactly how much air pressure is in the outlet line. The handle 53 on the regulator provides this adjustment.

As FIG. 3 indicates, the outlet 51 of the regulator 47 is connected by suitable conduits 54, 55, 56, 57, and 58 to the two inlet fittings 26 for the two gaskets. Thus, when the device is in use the air pressure from the regulator is used to expand the gasket as indicated at the right side of the tester 10 in FIG. 3 and in the enlarged view of FIG. 4. The regulator provides a desired pressure which is not only sufficient to cause the gasket to seal against the pipe but is also sufficient to retain it in place and prevent its partial collapse or leakage when the desired pressure of liquid or other fluid is placed in the test space between the two gaskets 18 and 20.

When liquid is the material to be tested at the pipeline joint, it is advisable to make sure that air and other gases are displaced from the annular test space. In the present invention a drain pipe 60 is provided which extends through the cylindrical wall 12 into this annular space, with the open upper end of the pipe reaching close to the surfaces of the pipes 37 and 38 above. Thus, the pipe 60 is aligned with respect to the rollers 35 such that it will be approximately midway between the two pairs of rollers but opposite them in the testing device 10. The drain pipe 60 is provided with a valve 61 which can be opened to release air or closed to commence fluid pressure testing. An elbow or short length of flexible hose 62 may extend from the drain valve to direct outwardly any liquid which might pass through the drain pipe when the test space first becomes full.

When the testing is to be done, the test apparatus 10 is rolled on the rollers 35 within the pipeline to the location of the pipe joint 36, and is arranged so that one gasket 18 will, when inflated, engage the walls of one pipe section 37 and the other gasket 20 will engage the walls of the adjacent pipe section 38, with the joint 36 lying between the two gaskets. Air pressure is then applied to inflate the two gaskets to a desired pressure which is read from the gauge 52. Then the valve 31 is opened to enable liquid, if such is the test fluid, to flow into the annular test space between the two gaskets. The drain valve 61 is also open at this time to enable air to flow out. As liquid flows in, the air is pushed up to the top by the advancing liquid or it bubbles through the liquid if trapped below. The liquid, which will usually be water, is preferably let in relatively slowly so it will run first to the bottom and move the air up gradually, thus enabling better freeing of the air. The drain valve 61 is left open until water begins to flow out the drain elbow 62, which indicates that the air has been substantially eliminated, and the valve can then be closed.

Thereafter the pressure in the test space can be increased to the desired level and the device can be retained in position for the desired time to determine whether the joint 36 can withstand the applied level of pressure. Joint leakage can be detected by a drop in pressure, as indicated by the gauge 30, with both valves 31 and 61 closed.

The flanges or walls 13, 14, 15, and 16 maintain the gaskets 18 and 20 in place under air pressure since only a relatively small portion of each gasket extends outside the walls, as shown in FIG. 4. It is substantially impossible for the gaskets to be worked out of their annular channels and expelled from the testing device, as has happened in other types of devices without this protection. The fact that each gasket is tightly engaged by walls on both sides prevents any lateral flexibility which might permit the gasket to work its way out of its channel.

When the test is completed the pressure can be relieved via the drain valve 61, and the test space can be drained of liquid by relieving gas pressure in the gaskets 16 and 20. The device can then be moved on to another joint location by its rollers or removed from the pipeline.

Figure 8:
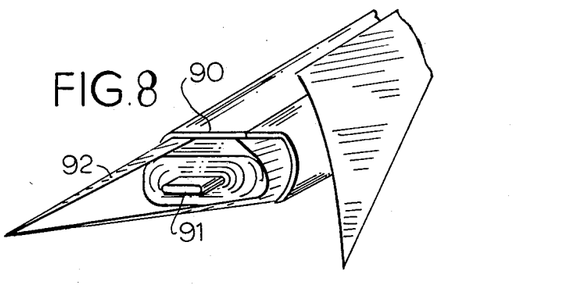
FIG. 8 is a fragmentary view in perspective of a tubular inflatable gasket as used in the invention in an early stage of manufacture.
Figure 9:
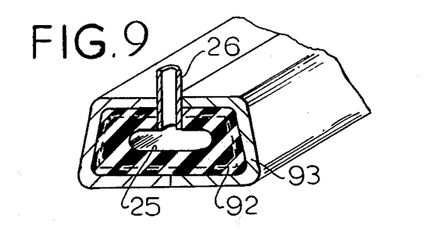
FIG. 9 is a similar view of the same gasket at a later stage of manufacture.
Figure 10:
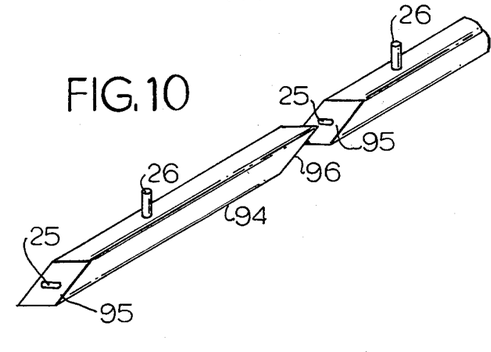
FIG. 10 is a similar view of the same gasket at a still later stage of manufacture.

Each of the gaskets 18, 20 is made (See FIGS. 8-10) by wrapping a sheet 90 of rubber around a metal rod or strip mandrel 91 which extends longitudinally for a desired distance longer than the perimeter of the gasket 18, 20 and in some cases several times as long, so that several gaskets can be made from each section. Strips 90 of natural rubber provided with suitable mixture of additional materials of the kind normally used, such as carbon black, suitable accelerators, sulphur, ozone D or "high-sil" to help give desired properties to the rubber are built up in strips on this rod. Then at a suitable thickness, one or two layers of tire cord 92 are placed between successive layers of the rubber strip, for more than 180° but preferably for somewhat less than a complete encirclement. The tire cord 92 is used in a width which is somewhat shorter than that of the other strips and is placed at a bias angle. If one strip is used, it may be at a 45° bias; if two strips are used they may both be biased at 45°, crossing each other at 90°. Other angles may be used, but these seem to be the most desirable. Then additional strips (or continuation of the same strip 90) of the natural gum rubber containing the desired compounding materials are wound around the cord.

Figure 11:
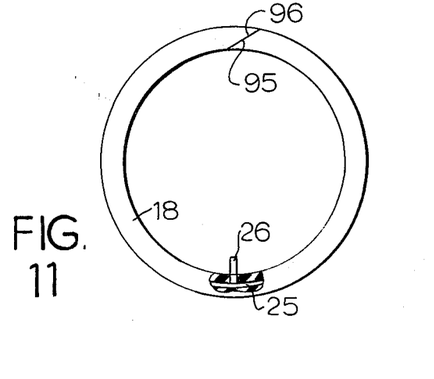
FIG. 11 is a view in side elevation of the completed gasket, a portion being shown in section.

Then the mandrel 91 is removed, leaving a passage 25 through the rubber, the assembly placed into a suitable mold 93, the assembly inflated by air passed through an air inlet fitting 26, and the entire assembly is then vulcanized, i.e., cured, at least partially. The resulting strip 94 (FIG. 10) may then be sliced at an angle at a desired location to give two inclined ends 95, 96, rubber cement is applied to the two ends 95,96, both at the same angle, and then brought around to form a circular loop of the desired dimensions (FIG. 11). Air inlet fittings 26 are put in place at a suitable stage of manufacture. The joint portion is vulcanized, with the result that when the gasket 18 is in use and expands, the tire cord 92 tends to straighten during the expansion to enable that expansion while also imparting considerable strength and tear resistance to the gum rubber. It has been found that with one or two strips 92 of the tire cord disposed as described, the gasket 18 is capable of retaining very large interior pressures.

Figure 5:
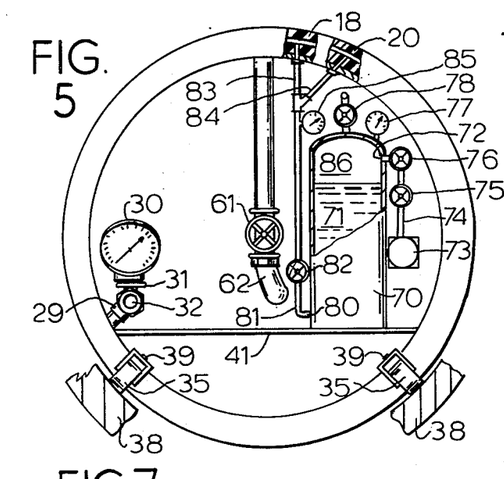
FIG. 5 is a view in end elevation, partly in section and partly diagrammatic, of a modified form of pipe joint testing apparatus, also embodying the invention.

FIG. 5 shows a testing unit similar to that of FIGS. 1-4, except that, as a safety precaution, the two gaskets 18 and 20 are to be filled with water instead of air. In this instance, the platform 41 supports a tank 70 filled with water 71 and having an air inlet 72. An air compressor 73 (which may be mounted on the platform 41 or may be distant from it) is connected to a conduit 74 that leads via a regulator 75 and a closure valve 76 to the air inlet 72. A pressure gauge 77 is connected to the top interior of the tank 70, as is a bleed valve 78. The valve 76 may be a three-way valve, and then no other bleed valve is needed.

From a bottom outlet 80 of the tank 70, a conduit 81 leads via a closure valve 82 to each of the two gaskets 18 and 20, via branch conduits 83 and 84. A pressure gauge 85 indicates the pressure in the conduit 81. Thus, air pressure in the upper portion 86 of the tank 70 is used to impel water under pressure into the gaskets 18 and 20, to inflate them and to seal against the pipe wall 38.

In use, the compressor 73 sends air under pressure to the regulator 75, where the pressure is regulated. When the valve 76 is opened the regulated air pressure is applied to the upper portion 86 of the tank 70, and the pressure may be read on the gauge 77. The air pressure sends water from the tank 70 to both gaskets 18 and 20, to inflate them, at a pressure indicated by the gauge 85.

Then the valves 76 and 82 may be closed to hold the pressures. Testing proceeds from there on as described above.

After testing is completed, when the pressure in the gaskets 18 and 20 is to be relieved, the bleed valve 78 is opened to bleed the air from the tank portion 86 to the atmosphere and to let the air in the tank 86 drop to atmospheric pressure. Then, with the valve 78 still open, the valve 82 is opened, and excess water flows back to the tank 70, raising the water level there.

Figure 6:
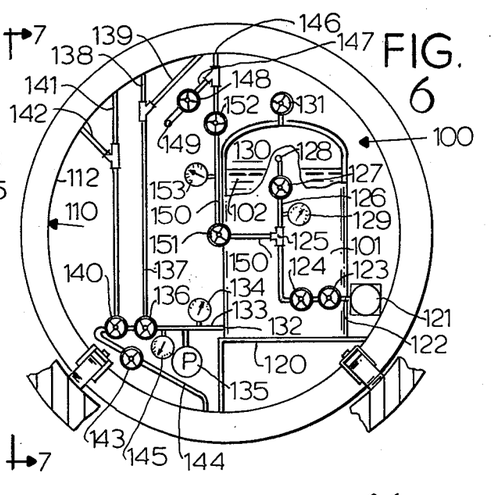
FIG. 6 is a similar view of a further form of pipe joint testing apparatus, also embodying the invention.
Figure 7:
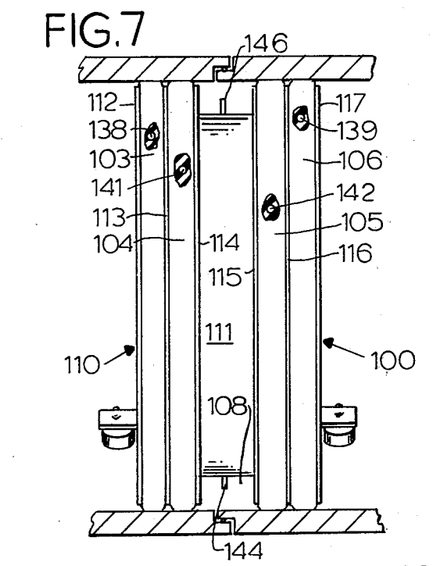
FIG. 7 is a view taken along the line 7—7 in FIG. 6, with some portions broken away and shown in section.

FIGS. 6 and 7 show a testing assembly 100 in which a common tank 101 is used to supply water 102 to four gaskets 103, 104, 105, and 106 and also to a test space 108 between the two pairs of gaskets. The testing assembly 100 may have an annular frame 110 generally like that of the frame 10, except that from its cylindrical wall 111 extend six radial walls 112, 113, 114, 115, 116, and 117. An outer gasket 103 fills the space between the walls 112 and 113; an inner gasket 104 fills the space between the walls 113 and 114. Similarly, an outer gasket 106 fills the space between the walls 116 and 117, and an inner gasket fills the space between the walls 115 and 116. The test space 108 lies between the walls 114 and 115. This structure thus provides further insurance against leakage; moreover, the outer gaskets 103 and 106 protect the inner gaskets 104 and 105 against displacement from their proper positions at high pressures. Normally, the outer gaskets 103 and 106 are inflated when in use to a pressure that is somewhat lower than that to which the inner gaskets 104 and 105, which may be the same pressure as that to which the test water is applied in the space 108.

A suitable platform 120 supports the large tank 101. A compressor 121 (either supported on the platform 120 or distant therefrom) is connected by a conduit 122, a valve 123, and a regulator 124 to a tee 125. From the tee 125 one branch 126 leads via a valve 127 to an air inlet 128 for the tank 101, there being a pressure gauge 129 for the pressure there. Air is applied to an upper portion 130 of the tank, above the level of the water 102, and an air bleed valve 131 is provided, which is normally closed.

At the bottom of the tank 101, an outlet 132 is connected to a conduit 133, there being a pressure gauge 134 to indicate the water pressure in the conduit 133. A pump 135 for achieving high pressures in the portion of the conduit 133 lying beyond the pump 135. A valve 136 connects the conduit 133 to a conduit 137 that leads to the outer gaskets 103 and 106 via branch conduits 138 and 139. A valve 140 leads from the conduit 133 to the inner gaskets 104 and 105 via branch conduits 141 and 142. A valve 143 connects the conduit 133 to a conduit 144 that leads to the lower end of the test space 108. There may also be a pressure gauge 145 beyond the pump 135.

This annular test space 108 is provided with an air bleed outlet 146 connected to a hose 147 having a valve 148 and an outlet 149. From the tee 125, a conduit 150 goes via a pressure regulator 151 and a valve 152 to the hose 146. There is a pressure gauge 153 from the conduit 150.

In operation, with the tank 101 nearly filled with water 102 and the valves 123, 127, 131, 136, 140, 143, 148, and 152 initially closed, the valves 148 and 136 are opened, and then the valves 123 and 127 are opened. With the air pressure properly regulated by the regulator 124, as indicated by the gauge 129, the air then impels the water 102 into the conduits 137, 138, and 139 to inflate the outer gaskets 103 and 106 to a water pressure indicated by the gauge 134. Then the valve 136 may be closed to retain that pressure, while the valve 140 is opened, and water is sent into the inner gaskets 104 and 105 to inflate them to a somewhat higher pressure indicated on the gauge 134, or the higher pressure (as well as the pressure for the gaskets 103 and 106) may be achieved with the aid of the pump 135 and read by the gauge 145. Then the valve 140 may be closed to retain the desired pressure in the inner gaskets 104 and 105.

Then, the valve 143 may be opened to apply water under pressure to the test space 108. The valve 148 is left open until the air is bled out from the space 108, and then when water begins to come out the hose 147, the valve 148 is closed. Pressure in the space is then built up to a desired test level.

After completion of the test, the valve 127, if not already closed, is closed, and the air bleed valve 131 is opened to reduce the pressure in the tank portion 130 to atmospheric. The valve 143 is opened to let water flow back into the tank 101 from the test space 108. The valve 152 may be opened and air, as regulated by the regulator 151 sent into the opening 146 to force the water out of the space 108; then the valve 152 is closed and the valve 148 opened. The valves 140 and 136 may then be opened to let the excess water in the gaskets flow back into the tank 101.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A high-pressure joint tester, for testing the ability of pipeline joints to retain fluids under pressure, including in combination:
   a rigid annular frame having a cylindrical wall with a series of outwardly extending radial walls integral therewith, there being a plurality of said radial walls on each side of a central portion of said cylindrical wall, with two said radial walls bounding said central portion to define a test space,
   a hollow annular inflatable ring filling the space between each successive pair of said plurality of radial walls on each side of said test space, each said ring having a circular interior passage and inlet means thereinto and through the adjacent cylindrical wall of said frame,
   a support mount secured to the interior of said cylindrical wall,
   pressurization means for sending fluid under pressure to all of said inflatable rings and for retaining them under a regulated pressure,
   pressurization means for sending fluid under pressure into said test space,
   a plurality of rollers mounted on a lower portion of said frame and supporting the frame for movement through a pipeline whose joint or joints are to be tested, and
   air drain means extending through and above the frame's cylindrical wall for said test space at the highest portion thereof above said rollers, said air drain means including a closure valve.

2. The high-pressure joint tester of claim 1 wherein said outwardly extending radial walls extend into close proximity with the pipeline walls adjacent to the joint to be tested and the spaces between said walls are relatively deep in comparison to the clearance between said radial walls and the pipeline walls, such that only a relatively small portion of each hollow inflatable ring extends outward into contact with the pipeline wall, whereby said rings are highly stable within said spaces and able to withstand high fluid test pressures without escaping said spaces.

3. A high-pressure joint tester, for testing the ability of pipeline joints to retain fluids under pressure, including in combination:
   a rigid annular frame having a cylindrical wall with first, second, third, and fourth radially outwardly extending walls integral therewith,
   a first hollow annular inflatable ring filling the space between said first and second walls and having a circular interior passage and an inlet in an inner cylindrical wall of the ring,
   a second hollow annular inflatable ring filling the space between said third and fourth walls and having a circular interior passage and an inlet in an inner cylindrical wall thereof,
   a support mount secured to the interior of said frame's cylindrical wall,
   ring inflating means supported by said support mount for sending a fluid under pressure into said rings for inflating them,
   fluid inlet means leading through said frame's cylindrical wall between said second and third radially outwardly extending walls,
   a fluid control valve connected at its outlet to said fluid inlet means and having an inlet for fluid under pressure,
   a pressure gauge connected to the outlet of said fluid control valve,
   a plurality of rollers mounted on a lower portion of said frame and supporting the frame for movement through a pipeline whose joint or joints are to be tested, and
   air drain means extending through and above the frame's cylindrical wall at the highest portion thereof above said rollers and between said second and third radially outwardly extending walls, said air drain means including a valve.

4. The joint tester of claim 3 wherein said ring inflating means comprises:
  a gas regulator valve having an inlet for receiving high pressure gas and an outlet for gas under regulated pressure, and
  conduit means connecting said regulator outlet to the inlets of both said first and second rings.

5. The joint tester of claim 3 wherein said ring inflating means comprises:
  a tank containing liquid and having an outlet connected to said inlet of both said first and second rings,
  pressurizing means for applying gas under pressure to the upper end of said tank and for relieving said pressure, at desired times, to inflate said first and second rings with liquid under pressure and to withdraw said pressure, at desired times.

6. A high-pressure joint tester for testing the ability of a pipe joint between two pipe sections to retain a fluid under pressure, comprising:
  two pairs of plugs, each pair having two annular rigid channels, each channel containing an inflatable elastomeric annular tube, said channels being in spaced parallel relationship with the two pairs of plugs spaced apart from each other,
  a rigid annular wall spanning between said pairs of plugs and joining all said channels in a leak-tight fit therewith,
  means for inflating said tubes at preselected pressures to seal against interior pipe walls on opposite sides of said joint, and
  means for introducing fluid under a known pressure through said annular wall to the outer surface thereof in between said pairs of plugs.

7. The joint tester of claim 6 having roller means for supporting said plugs and wall and enabling movement along the pipes to be tested.

8. The joint tester of claim 7 which further includes isolation means for isolating said fluid from its source of supply and
  gauge means in communication with the isolated fluid for monitoring the pressure of the fluid to detect leakage thereof.

9. A high-pressure joint tester, for testing the ability of pipeline joints to retain fluids under pressure, including in combination:
  a rigid annular frame having a cylindrical wall with first, second, third, fourth, fifth, and sixth outwardly extending radial walls integral therewith,
  a first ring filling the space between said first and second radial walls,
  a second ring filling the space between said second and third radial walls,
  a third ring filling the space between said fourth and fifth radial walls,
  a fourth ring filling the space between said fifth and sixth radial walls,
  each of said first, second, third, and fourth rings being hollow and inflatable and having a circular interior passage and an inlet in an inner cylindrical wall thereof,
  a support mount secured to the interior of said frame's cylindrical wall,
  ring inflating means supported by said mount for inflating all of said rings and for deflating them,
  fluid inlet means leading through said frame's cylindrical wall between said third and fourth radially outwardly extending walls,
  a fluid control valve connected at its outlet to said fluid inlet means and having an inlet for fluid under pressure,
  a pressure gauge connected to the outlet of said fluid control valve,
  a plurality of rollers mounted on a lower portion of said frame and supporting the frame for movement through a pipeline whose joint or joints are to be tested, and
  air drain means extending through and above the frame's cylindrical wall at the highest portion thereof above said rollers and between said third and fourth radially outwardly extending walls, said air drain means including a valve.

10. The joint tester of claim 9 wherein
said ring inflation means comprises:
  a liquid-containing tank having an outlet adjacent its lower end connected to said inlets of all said rings,
  gas pressurization means connected to the upper end of said tank for applying regulated pressure to the liquid within said tank, and
  pressure gauge means for indicating the pressure of liquid applied to said rings.

11. The joint tester of claim 9 wherein said inlet of said fluid control valve is connected to said tank outlet.

12. The joint tester of claim 11 having valve means enabling separate application of the same liquid from said tank (1) to the area between said third and fourth walls (2) to the rings closest to said area, and (3) to the rings further from said area.

13. The joint tester of claim 11 having means for applying gas from said gas pressurization means to said drain means for forcing liquid from the area between said third and fourth walls into said tank.

14. A method for testing the ability of pipe joints to retain fluids under pressure comprising:
  transporting through the pipeline an annular frame smaller than the interior of the pipeline, until said frame bridges a joint to be tested,
  inflating with a liquid under pressure a spaced-apart pair of gasket assemblies that are rigidly retained by said frame, one on each side of said joint, each gasket assembly being axially within a different one of the two pipes, and thereby sealing off the exterior of said frame relative to both pipes,
  introducing between said gasket assemblies and through said frame, into the annular space between said frame and said pipes, a fluid under a known pressure, and
  determining whether any leakage of said fluid occurs out from said space at known pressures of said fluid, said gasket assemblies being kept inflated at such pressure as retains the fluid against leakage between said frame and said pipes.

15. The method of claim 14 wherein the transporting step comprises rolling the annular frame along a lower portion of the pipeline on rollers connected to a lower portion of the frame.

16. A method for testing the ability of pipe joints to retain fluids under pressure comprising:
  transporting through the pipeline an annular frame smaller than the interior of the pipeline, until said frame bridges a joint to be tested,
  inflating with liquid a spaced-apart pair of gasket two assemblies each that are rigidly retained by said frame, one pair on each side of said joint, each gasket assembly being axially within a different one of the two pipes, and thereby sealing off the exterior of said frame relative to both pipes, introducing between said gasket assemblies and through said frame, into the annular space between said frame and said pipes, a liquid while expelling air from said space, closing off said space after the air has been expelled, applying a known pressure to said liquid in said space, and determining whether any leakage of said liquid occurs out from said space at said known pressure of said liquid, said gasket assemblies being kept inflated at such pressure as retains the liquid against leakage between said frame and said pipes.

17. A method for testing the ability of pipe joints to retain fluids under pressure comprising:

rolling through the pipeline a roller-mounted annular frame smaller than the interior of the pipeline, until said frame bridges a joint to be tested, inflating with liquid a spaced-apart pair of gasket assemblies that are rigidly retained by said frame, one assembly on each side of said joint, each gasket assembly being axially within a different one of the two pipes, and thereby sealing off the exterior of said frame relative to both pipes, introducing liquid between said gasket assemblies and through said frame, into the annular space between said frame and said pipes, while expelling air through a drain outlet from the upper end of said annular space, closing off said drain outlet after the air has been expelled, exerting a known pressure on said liquid after said outlet has been closed, and determining whether any leakage of said liquid occurs out from said space at said known pressure of said liquid, said gasket assemblies being kept inflated at such pressure as retains the liquid against leakage between said frame and said pipes.

* * * * *

UNITED STATES PATENT OFFICE
CERTIFICATE OF CORRECTION

Patent No. 4,070,904　　　　　　　　　　Dated January 31, 1978

Inventor(s)　Gerald J. VanderLans

It is certified that error appears in the above-identified patent and that said Letters Patent are hereby corrected as shown below:

On the title page, item [76] the inventor's name should read -- Gerald J. VanderLans --.

Signed and Sealed this

Fourth Day of July 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,070,904
DATED : January 31, 1978
INVENTOR(S) : Gerald J. VanderLans It is certified that error appears in the above-identified patent and that said Letters Patent are hereby corrected as shown below:

Column 3, line 10, "gasekt" should read --gasket--.

Column 10, line 27, "claim 9" should read --claim 10--.

Column 10, line 67, "gasket two" should read --two gasket--.

Signed and Sealed this

Fifteenth Day of August 1978

[SEAL]

Attest:

RUTH C. MASON
Attesting Officer

DONALD W. BANNER
Commissioner of Patents and Trademarks